H. D. PRATT.
MEANS FOR BREAKING FLOATING ICE INTO BLOCKS.
APPLICATION FILED AUG. 31, 1916.
1,205,013.
Patented Nov. 14, 1916.
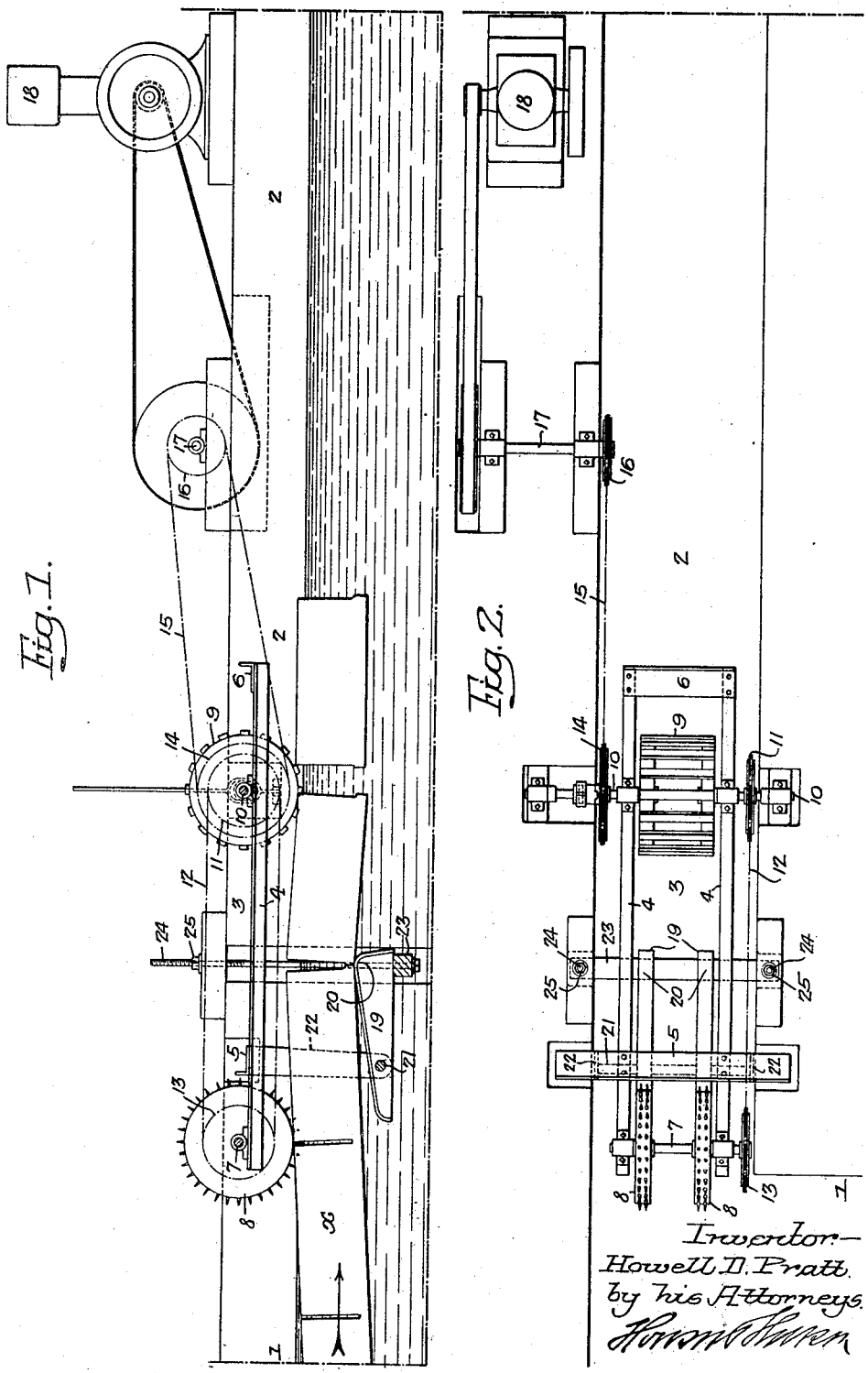
Inventor—
Howell D. Pratt,
by his Attorneys

UNITED STATES PATENT OFFICE.

HOWELL D. PRATT, OF PHILADELPHIA, PENNSYLVANIA, ASSIGNOR TO LINK-BELT COMPANY, OF CHICAGO, ILLINOIS, A CORPORATION OF ILLINOIS.

MEANS FOR BREAKING FLOATING ICE INTO BLOCKS.

1,205,013.

Specification of Letters Patent.

Patented Nov. 14, 1916.

Application filed August 31, 1916. Serial No. 117,891.

*To all whom it may concern:*

Be it known that I, HOWELL D. PRATT, a citizen of the United States, residing in Philadelphia, Pennsylvania, have invented certain Improvements in Means for Breaking Floating Ice into Blocks, of which the following is a specification.

My invention relates to certain improvements in the means for handling ice which has been previously cut into strips and is ready to be transferred to an ice storage house, or other receptacle. In apparatus of this type the ice is cut into small strips which are partly severed and are finally broken into blocks or cakes, which are conveyed to the storage point.

The object of my invention is to provide means for accurately and quickly breaking these strips of partially cut ice into blocks, as they travel uninterruptedly to the storage point from the ice cutting apparatus.

In the accompanying drawing:—Figure 1, is a longitudinal sectional view of my improved apparatus for breaking the blocks apart; and Fig. 2, is a plan view of the same.

Referring to the drawing, 1 is the basin in which the ice is cut into comparatively long strips; three or four cakes of ice a being connected together by a narrow web, as clearly shown in Fig. 1. Each strip of ice is directed into a narrow channel 2 leading to the elevating, or other, apparatus by which the cakes or blocks of ice are carried to the ice storage house, cars, or other receptacle.

3 is the frame of my improved feeder and breaker, consisting of longitudinal side bars 4 connected by cross bars 5 and 6. Both of these cross bars are made of angle iron, as well as the longitudinal members, although they may be made of wood. The cross bar 5 extends into the bank of the channel and regulates the height of the feed wheels.

At the forward end of the frame 3 is a transverse shaft 7 adapted to suitable bearings in the frame, and on this shaft are two feed wheels 8 spaced a given distance apart and provided with comparatively sharp teeth, as shown, to engage the blocks of ice as they are fed from the basin into the narrow channel. At the opposite end of the frame is a breaker wheel 9 mounted on the transverse shaft 10. This breaker wheel is comparatively wide and, in the present instance, has a series of slats which are arranged to engage the surface of the ice, but do not enter the ice to the same depth as the teeth of the feed wheel. The shaft 10 has a sprocket wheel 11 thereon and a drive chain 12 passes around this wheel 11 and around a sprocket wheel 13 on the shaft 7 so that both the feed wheels and the breaker wheel are driven at the same speed. They are of substantially the same diameter. In some instances the breaker wheel 9 may be provided with teeth similar to those of the feed wheel. On the shaft 10, in the present instance, is also a sprocket wheel 14 around which passes a drive chain 15 from a sprocket wheel 16 from a counter shaft 17 driven from an engine or motor 18 located at the side of the channel, as shown in Fig. 2.

Located below the level of the water in the channel 2 is a breaker 19 having a hump 20. This breaker is located between the feed wheels and the breaker wheel and is mounted on a pivot 21 carried by brackets 22 depending from the frame 3. The breaker is made as clearly shown in Fig. 1 and preferably with a wooden base having metal rails thereon. A cross bar 23 secured to the breaker is carried by two vertical rods 24, screw threaded at their upper ends and these rods pass through fixed plates at the side of the channel and are provided with nuts 25 so that, on turning the nuts, the breaker can be raised or lowered.

The frame 3 is set in the channel so that the wheels will depress the ice as it floats in the water and the teeth of the feed wheel will engage the ice sufficiently to move the strip forward over the hump of the breaker; the breaker being adjusted according to the thickness of ice being cut, so that the block will be raised by the breaker above the normal floating line and, when it passes over the breaker as illustrated in the drawings, it is forced down by the breaker wheel, causing the thin connection of ice between the blocks to be positively broken and this break is usually clean, thus insuring a proper squaring of the ice, as it will be understood that all blocks of ice, in which corners of any size are broken off, must be discarded.

The feed wheels 8 do not positively feed the ice forward, but will feed the ice unless there is an obstruction at the chute, and should an obstruction occur the teeth will plow through the ice without feeding.

I claim:—

1. The combination of a channel in which the partly severed ice is floated; a feed wheel above the channel for engaging the surface of the ice and feeding it forward; a breaker wheel at the rear of the feed wheel; and a breaker located in the channel between the two wheels and over which the ice must pass, so that as the ice is fed it will travel on the breaker and will be depressed, after it passes over the breaker, by the breaker wheel.

2. The combination of a channel in which the ice is allowed to float; means for feeding the ice forward in the channel; a breaker located in the channel below the surface of the ice therein and of such depth that it will raise the ice above the floating level; and a rotating breaking wheel at the rear of the breaker arranged to depress the ice and to cause it to positively break the ice into blocks.

3. The combination of a channel in which the ice to be broken is floated; a frame located above the channel; a shaft at each end of the frame; feed wheels mounted on the forward shaft and having teeth adapted to engage and feed the ice positively forward; a breaker wheel on the other shaft having slats arranged to engage the ice; and a breaker adjustably mounted in the channel at such a depth that it will bear upon the under side of the ice, causing it to lift the ice as it is moved forward, the breaker wheel depressing the ice and causing it to be severed into blocks as it passes over the breaker.

4. The combination of a channel in which ice is floated; a frame supported above the channel; a feed wheel mounted at the forward end of the frame and having teeth arranged to engage the ice and to feed it forward; a breaker having an inclined surface ending in a hump and located below the water level in the channel so as to lift the partially severed blocks of ice as they are passed thereover; means for pivoting the breaker and for vertically adjusting the same; and a breaker wheel located at the rear of the breaker and arranged to depress the ice, insuring the ice being separated into blocks.

5. The combination of a channel through which the partially cut ice is passed; a frame located above the channel; a feed wheel for engaging the upper surface of the ice to feed it forward; a breaker wheel at the rear of the feed wheel; slats on the breaker wheel and means for rotating the two wheels in unison; a breaker located between the two wheels and below the surface of the water in the channel, said breaker being pivoted; and means for vertically adjusting one end of the breaker so as to form a hump over which the ice is passed in order to cause the partly severed ice to be separated, the breaker wheel depressing the ice after it passes the breaker so as to insure the positive separation of the severed blocks.

HOWELL D. PRATT.

Copies of this patent may be obtained for five cents each, by addressing the "Commissioner of Patents, Washington, D. C."